(12) United States Patent
Hatta et al.

(10) Patent No.: US 6,418,119 B1
(45) Date of Patent: Jul. 9, 2002

(54) DATA TRANSMISSION APPARATUS AND METHOD THEREOF

(75) Inventors: Tomoaki Hatta, Chigasaki; Hideaki Kashimura, Tokyo-to, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/143,791

(22) Filed: Aug. 31, 1998

(30) Foreign Application Priority Data

Sep. 22, 1997 (JP) .............................................. 9-256705

(51) Int. Cl.$^7$ .............................................. H04L 12/26
(52) U.S. Cl. ...................................................... 370/235
(58) Field of Search .................................. 370/236, 252, 370/254, 428, 441, 229, 230, 231, 232, 233, 395, 389, 237, 242, 468, 465, 447, 351, 352, 412–419, 459, 457, 235

(56) References Cited

U.S. PATENT DOCUMENTS 6,185,189 B1 * 2/2001 Brassier et al. ............. 370/252

OTHER PUBLICATIONS

US 6,144,664, 11/2000, Williams et al. (withdrawn)*
Abstract—"Inter–Local Area Network Frame Relay Network Bridge Device", from Japanese Patent No. 08–163177.
Abstract—"Frame Relay Equipment", from Japanese Patent No. 09–64916.
Abstract—"Image Processor", from Japanese Patent No. 07–73291.
Abstract—"Congestion Controller For Frame Relay Communication Terminal Equipment", from Japanese Patent No. 09–93284.
Abstract—"Congestion Control System", from Japanese Patent No. 07–15436.

* cited by examiner

*Primary Examiner*—Dang Ton
(74) *Attorney, Agent, or Firm*—Jerry W. Herndon

(57) ABSTRACT

In a communication system pursuant to the frame relay (FR) architecture, to prevent disability of a data transmission due to the discarding of LMI data. When receiving FR frames from an FR terminal 16, a multiplexer 14-2 separates LMI frames stored with LMI data from user frames stored with user frames, based on values of DLCI address fields, and queues them separately. The multiplexer 14-2 sends all of the queued LMI frames via the data transmission path 18 in a preferential manner and, then, it sends a portion of the queued user frames that is transmissible by a remaining portion of the transmission capacity to the data transmission path 18, thereby causing the user frames alone to be subjected to shaping processing.

8 Claims, 3 Drawing Sheets

DATA TRANSMISSION APPARATUS AND METHOD THEREOF

TECHNICAL FIELD

This invention relates to a data transmission apparatus and a method thereof for use in a physical layer apparatus that handles a circuit for transmitting data between a plurality of communication nodes pursuant to the frame relay (FR) architecture. The invention prevents an LMI (Local Management Interface) frame stored with communication controlling data from being discarded when there occurs abandshortage/congestion, thereby to prevent an occurrence of any disorganized communication control between communication nodes. More specifically, this invention relates to a data transmission apparatus and a method thereof for use in such a data transmission system, which are capable of effectively performing congestion control between communication nodes without violating a communication protocol of the frame relay architecture even if there occurs a band shortage/congestion.

BACKGROUND OF THE INVENTION

The frame relay (FR) architecture, characterized by using a packet switching technique with a simplified processing scheme and by establishing a virtual circuit (PVC: Permanent Virtual Circuit) via a data communication network, has been practically used in the art to transmit data between communication nodes to each other. To implement the frame relay architecture, it is necessary that a frame relay switching equipment, a frame relay multiplexer and a router support an LMI for sharing data (LMI data) indicating the status of a virtual circuit between them and used for communication control.

In such frame relay architecture, however, if data traffic increases and results in a band shortage of a transmission path, FR data may be randomly discarded. That is, in case of shaping a frame relay circuit (i.e., decreasing a data amount of FR data in line with a transmission capacity of a transmission path), LMI data required for communication control may be discarded at the time of an occurrence of congestion, which may cause the virtual circuit to be disabled and lead to an undesirable situation where no data transmission is possible.

Japanese Patent Publications, PUPA (publication of unexamined patent application) H8-163177, PUPA H9-64916, PUPA H7-73291, PUPA H9-93284 and PUPA H7-15436 (References 1 to 5), disclose congestion control schemes in the frame relay architecture. However, none of the congestion control schemes disclosed in these References is adapted for solving a problem of the frame relay architecture that LMI data may be discarded at the time of an occurrence of congestion and consequently any further data transmission may become impossible. Nor do they satisfy the requirement of performing effective congestion control between data terminals.

In view of the aforementioned problem of the prior art, it is an object of this invention to provide a data transmission apparatus and a method thereof for use in a communication system, which are capable of transparently transmitting data required for communication control between communication nodes even if there occurs a band shortage/congestion. More particularly, it is another object of this invention to provide a data transmission apparatus and a method thereof for use in a communication system configured to perform a data transmission pursuant to the frame relay architecture, which are capable of transmitting all data required for supporting an LMI necessarily used for communication control between communication nodes even if there occurs a band shortage/congestion.

It is yet another object of this invention to provide a data transmission apparatus and a method thereof for use in an apparatus configured to perform a data transmission pursuant to the frame relay architecture, which are capable of effectively performing congestion control between data terminals with a simple process by noting a result of operation made by said apparatus with respect to congestion controlling data (CN bits) within a data transmitting frame (FR frame).

SUMMARY OF THE INVENTION

In order to accomplish said objects of this invention, there is provided a data transmission apparatus for connecting a plurality of communication nodes to transmit data via circuits established between said communication nodes, said plurality of communication nodes transmitting control data for use in controlling the data transmission and communication data other than said control data to each other, comprising: control data queuing means for queuing said control data from at least a first one of said communication nodes transmitting data to each other (first communication node); and data transmission means for transmitting all of said queued control data and at least a portion of said communication data from said first communication node to another one of said communication nodes (second communication node) in accordance with a transmission capacity between said communication nodes.

Preferably, said communication nodes store said control data or said communication data into certain frames and transmit the said frames to each other; said certain frames contain identification data for indicating whether or not at least said control data is stored therein; said control data queuing means comprises: separation means, responsive to said identification data contained in said frames received from said first communication node, for separating said frames stored with said control data from said frames stored with said communication data; a control data queue for queuing said separated frames stored with said control data; and a communication data queue for queuing said separated frames stored with said communication data; and said data transmission means transmits all of said queued frames stored with said control data and at least a portion of said queued frames stored with said communication data to said second communication node in accordance with a transmission capacity between said communication nodes transmitting data to each other.

Preferably, said data transmission means comprises: congestion detection means for detecting an occurrence of congestion between said first communication node and said second communication node when a data amount of said queued frames stored with said control data and/or said queued frames stored with said communication data exceeds a certain threshold value; and sending means, responsive to detection of the congestion between said first communication node and said second communication node, for sending all of said queued frames stored with said control data and at least a portion of said queued frames stored with said communication data, which is within the rest of the transmission capacity between said first communication node and said second communication node, to said second communication node.

Preferably, said plurality of communication nodes store said control data and said communication data into said frames (FR frames) pursuant to the frame relay architecture and transmit the said FR frames to each other in such a manner that in case of storing said control data into the said FR frames, addresses (DLCIs) therein used as said identification data are set to have certain values, whereas in case of storing said communication data into the said FR frames, said DLCIs are set to have values other than said certain values; and said separation means separates said FR frames stored with said control data and said DLCIs having said certain values from said FR frames stored with said communication data and said DLCIs having values other than said certain values.

Preferably, said sending means sets congestion controlling data (CN bits) of said FR frames to values indicating an occurrence of congestion while there is occurring congestion between said first communication node and said second communication node and sends the said FR frames to said second communication node; and each of said plurality of communication nodes is responsive to said CN bits of received FR frames indicating the occurrence of congestion for performing congestion control pursuant to said frame relay architecture.

The data transmission apparatus of this invention may take the form of a multiplexing equipment for transmitting data between data terminals, data transmission equipment, communication networks and the like (hereinafter, these equipment/systems will be generally called "communication nodes"), which is responsive to an occurrence of band shortage/congestion (hereinafter, a band shortage due to a transmission capacity's shortage and an inherent cause of the FR system such as a contract of PVC or the like, and congestion will be collectively called "congestion"), assuming necessity of discard of data, for indicating status of a virtual circuit (PVC), discarding only non-transmission controlling data (communication data: user data) alone other than transmission controlling data (control data: LMI data), and transparently transmitting all of LMI data between the communication nodes, thereby enabling to continually perform normal communication control between the communication nodes.

Note that a communication node, performing a data transmission pursuant to the frame relay architecture, stores user data or LMI data into a certain frame (FR frame). Also, a communication node sets a predetermined value defined by various standards (e.g., "0" for the ANSI standard, or "1,023" for the Frame Relay Forum's standard) into an address (DLCI: Data Link Connection Identifier) in an FR frame stored with LMI data (LMI frame), whereas it sets another value into DLCI in an FR frame stored with user data, thereby transferring such an FR frame to its corresponding communication node.

Also, in accordance with the frame relay architecture, a communication node performs congestion control in response to congestion controlling bits (CN bits) in an FR frame. In general, a communication network for transmitting an FR frame is configured to set the congestion controlling bits (CN bits) in an FR frame to have a predetermined value ("1") for indicating an occurrence of congestion. On the other hand, in another situation where no congestion occurs, such a communication network is configured to set another value ("0") for indicating non-occurrence of congestion. The data transmission apparatus of this invention is constructed to operate on the premise of the standards of the frame relay architecture as described above.

In the data transmission apparatus of this invention, the separation means associated with the control data queuing means checks a value of DLCI in an FR frame transmitted between communication nodes, and if a value of DLCI in an FR frame received from a first one of the communication nodes (first communication node) is equal to "0" (according to the ANSI standard), it determines that the FR frame is an LMI frame stored with LMI data, and enters the FR frame into the control data queue. Also, if a value of DLCI in an FR frame received from the first communication node is not equal to "0", the separation means determines that the FR frame is a user frame stored with user data, and enters the FR frame into the communication data queue.

The congestion detection means associated with the data transmission means detects an occurrence of congestion between the communication nodes in such an exemplary situation where a data amount of user frames queued in the communication data queue exceeds a threshold value, which is preset based on those factors such as a transmission capacity between the first communication node and its corresponding communication node (second communication node), a queue's capacity and the like.

For example, the sending means, being responsive to detection of the congestion between the communication nodes, initially sends all of the queued LMI frames to the second communication node and after completion of sending all of the control data, it sends a transmissible portion of the queued user frames alone to the second communication node. In other words, the sending means sends the queued LMI frames in a preferential manner and, then, it sends the user frames by making use of the remaining portion (rest) of the transmission capacity, thereby causing the user frames alone to be subjected to shaping processing in a selective or sequential manner.

Also, during a period starting when a data amount of the user data exceeds the threshold value and ending when the data amount goes below the threshold value again, namely, as far as the congestion detection means detects such a sustained or pending occurrence of congestion, the sending means sets congestion controlling bits (congestion controlling data: CN bits) in an FR frame to a value ("1") for indicating an occurrence of congestion and, then, sends the FR frame to the second communication node for notifying this node of the occurrence of congestion, thereby causing this node to perform congestion control.

As described above, since a communication network between communication nodes does not, in general, set the congestion controlling bits to "0", there can be no such case where the congestion controlling bits once set by the sending means to "1" is reversed to "0" again by processing of the communication network. Accordingly, when the sending means sets a value of the congestion controlling bits to "1", it is possible to notify the second communication node of the occurrence of congestion.

Further, in accordance with another aspect of this invention, there is provided a data transmission method for transmitting data via circuits established between a plurality of communication nodes, comprising the steps of: at said plurality of communication nodes, storing control data for use in controlling a data transmission pursuant to the frame relay architecture or communication data other than said control data into frames (FR frames) pursuant to said frame relay architecture, setting addresses (DLCIs) therein to have values for indicating whether or not the said FR frames are stored with said control data, and transmitting the said FR frames to each other; if the values of said DLCIs contained in said FR frames received from a first one of said communication nodes (first communication node) indicate that the said received FR frames are stored with said control data, separating the said received FR frames as FR frames stored with said control data; if the values of said DLCIs contained in said FR frames received from said first communication node indicate that the said received FR frames are not stored with said control data, separating the said received FR frames as FR frames stored with said communication data; queuing said separated frames stored with said control data; queuing said separated frames stored with said communication data; if a data amount of said queued frames stored with said control data and/or said queued frames stored with said communication data exceeds a certain threshold value, detecting an occurrence of congestion between said first communication node and another one of said communication nodes transmitting data to each other (second communication node); and responding to detection of the congestion between said first communication node and said second communication node for transmitting all of said queued frames stored with said control data and at least a portion of said queued frames stored with said communication data, which is within the rest of the transmission capacity between said first communication node and said second communication node, to said second communication node.

Preferably, while there is occurring congestion between said first communication node and said second communication node, congestion controlling data (CN bits) of said FR frames are set to values indicating an occurrence of congestion for sending the said FR frames to said second communication node; and at each of said plurality of communication nodes, said CN bits of received FR frames indicating the occurrence of congestion are used for performing congestion control pursuant to said frame relay architecture.

DETAILED DESCRIPTION OF THE DRAWINGS

Figure 1:
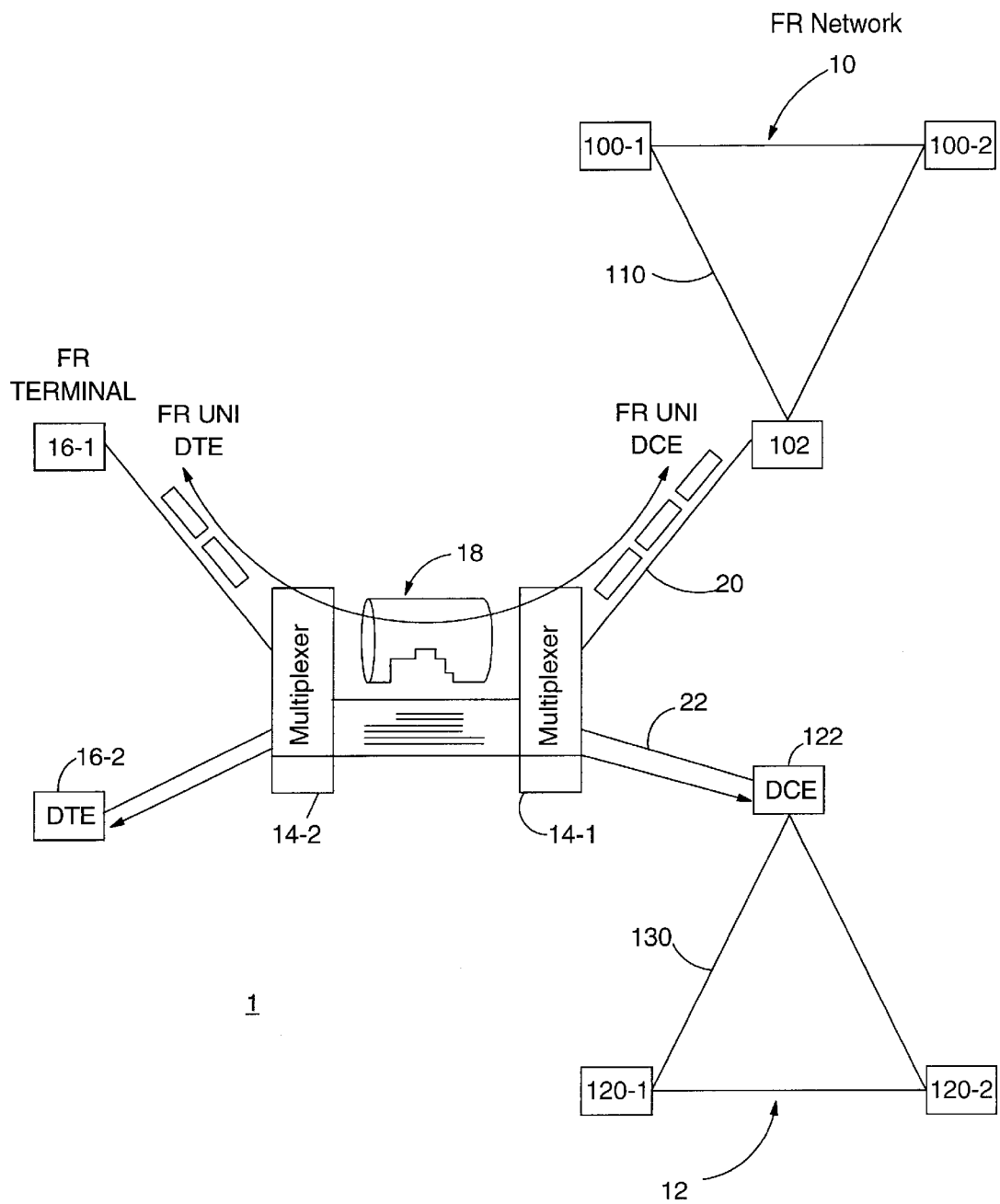
FIG. 1 is a diagram illustrating a configuration of a data transmission system, wherein a data transmission method of this invention may be applied.

FIG. 1 illustrates a configuration of a data transmission system 1, wherein a data transmission method of this invention may be applied. As shown in FIG. 1, the data transmission system 1 comprises a communication network (FR network) 10 pursuant to the frame relay architecture, a communication network 12 pursuant to the frame relay architecture or another architecture, k multiplexers 14-1 to 14-k, m FR terminals (FR UNI DTE (Data Terminal Equipment)) 16-1 to 16-m, and data transmission paths 18 to 22.

The communication network 10 comprises n units of frame relay switching equipment (FR UNI DCE (Data Circuit Terminating Equipment)) 100-1 to 100-n, frame relay switching equipment 102 and a data transmission path 110.

The communication network 12 comprises communication nodes 120-1 to 120-p, 122 and a data transmission path 130.

Note that FIG. 1 illustrates a case of k, m, n, p=2.

The data transmission system 1 multiplexes plural types of data (e.g., computer data processed by a computer, voice data and the like) into transmission frames pursuant to the frame relay architecture or another architecture, and transmits these frames between a plurality of communication nodes (the communication networks 10, 12 and the FR terminals 16-1, 16-2) via a common transmission path 18.

Also, the data transmission system 1 indicates status of a virtual circuit (PVC: Permanent Virtual Circuit) used in the frame relay architecture and the like to continually control a data transmission in a normal manner even where there occurs congestion between communication nodes that perform a communication pursuant to the frame relay architecture, and preferentially transmits LMI data used for controlling a data transmission (communication control) between communication nodes to prevent an FR frame stored with LMI data (LMI frame) from being discarded.

Also, the data transmission system 1 performs congestion control between an FR terminal 16 (hereinafter, when an arbitrary one of the FR terminals 16-1, 16-2 is referred to, it will be simply called "FR terminal 16") and a frame relay switching equipment 100 (hereinafter, when an arbitrary one of the frame relay switching equipment 100-1, 100-2 is referred to, it will be simply called "frame relay switching equipment 100") by making use of congestion controlling bits (CN bits) contained in an FR frame.

Figure 2:
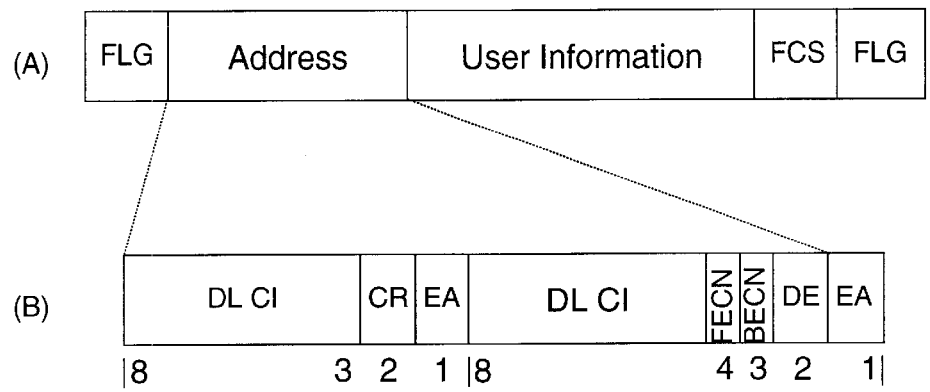
FIG. 2(A) and FIG. 2(B) are diagrams illustrating a format of an FR frame, which is standardized by ITU Q.922 and transmitted between respective constituents of the data transmission system shown in FIG. 1.

FIG. 2(A) and FIG. 2(B) illustrate a format of an FR frame, which is standardized by ITU Q.922 and transmitted between respective constituents of the data transmission system 1 shown in FIG. 1. As shown in FIG. 2(A), an FR frame comprises an address field, a user information field, an FCS field and FLG fields. Referring to FIG. 2(B), the address field shown in FIG. 2(A) comprises a data link connection identifier (DLCI), a command/response (CR) bit, an extended address (EA) bit, a forward explicit congestion (FECN) bits, backward explicit congestion (BECN) bits, and discard eligible (DE) bits.

In the address field (DLCI: FIG. 2(B)) of an FR frame, the data link connection identifier is 10 bit data for identifying a connected-to communication node (destination of an FR frame). Note that the upper 6 bits of the data link connection identifier are stored into the first octet, whereas the remaining 4 bits are stored into the second octet. The command/response bit indicates whether data contained in the user information field is an instruction (command) or a response. The extended address bit indicates whether or not the data link connection identifier is extended. If it indicates that the data link connection identifier is extended, the data link connection identifier can be extended by an extended address scheme.

The CN bits (hereinafter, a combination of the forward explicit congestion bit and the backward explicit congestion bit will be collectively called "CN bits") are used by the frame relay switching equipment 100, 102 of the communication network 10 to notify a destination (connected-to node) and a source (connecting node) of its FR frame of an occurrence of congestion whenever there occurs congestion in the network. For this purpose, a value of the CN bits is set to "1", and this value is not in general changed in another situation. Incidentally, those communication nodes (FR terminals and frame relay switching equipment) which have been notified of such an occurrence of congestion suppress sending of FR frames, thereby to perform congestion control in accordance with the standards of the frame relay architecture.

Also, the value of the CN bits is set to "1" as well, whenever congestion is detected by a multiplexer 14 (hereinafter, when an arbitrary one of the multiplexers 14-1, 14-2 is referred to, it will be simply called "multiplexer 14"). A communication node (FR terminal or the like), which has received an FR frame having its CN bits set to "1" by the multiplexer 14, performs congestion control in the same manner as it has received an FR frame having its CN bits set to "1" by the frame relay switching equipment 100, 102 of the communication network 10.

The discard eligible bits indicates whether or not an FR frame containing this data is eligible for discarding, such that an FR frame indicated to be eligible for discarding may be discarded by a communication node at the time of an occurrence of congestion or the like.

The user information field (FIG. 2(A)) of an FR frame contains data, which indicates a content of information, an instruction (command) and a response to an instruction to be transmitted between communication nodes. The FCS field contains data (CRC data: x 16+x 12+x 5+1) used for frame check sequence. The FLG fields contain flags having the same value (7Eh) as the HDLC procedure.

Now, each constituent of the data transmission system 1 will be described.

In the communication network 10, the data transmission path 110 may be a high speed leased circuit, an ATM communication network, a B-ISDN network or the like, which has a larger transmission capacity adapted for transmitting an FR frame in high speed.

The frame relay switching equipment 102 performs switching of data inputted from the frame relay switching equipment 100 via the data transmission path 110 in accordance with a user network interface (FR-UNI) of the frame relay architecture, and outputs such data to the FR terminal 16 via the data transmission path 20. Also, the frame relay switching equipment 102 performs switching of data inputted from the FR terminal 16 via the data transmission path 20, and outputs such data to the frame relay switching equipment 100 via the data transmission path 110.

In the communication network 12, the data transmission path 130 may be a high speed leased circuit, an ATM communication network or a B-ISDN network, which has a larger transmission capacity adapted for transmitting data/voice pursuant to the frame relay architecture or another architecture in high speed.

The communication node 122 outputs data, inputted from a communication node 120 (when an arbitrary one of the communication nodes 120-1, 120-2 is referred to, it will be simply called "communication node 120") via the data transmission path 130, to the data transmission path 22. Conversely, the communication node 122 outputs data, inputted via the data transmission path 22, to the communication node 120 via the data transmission path 130.

Figure 3:
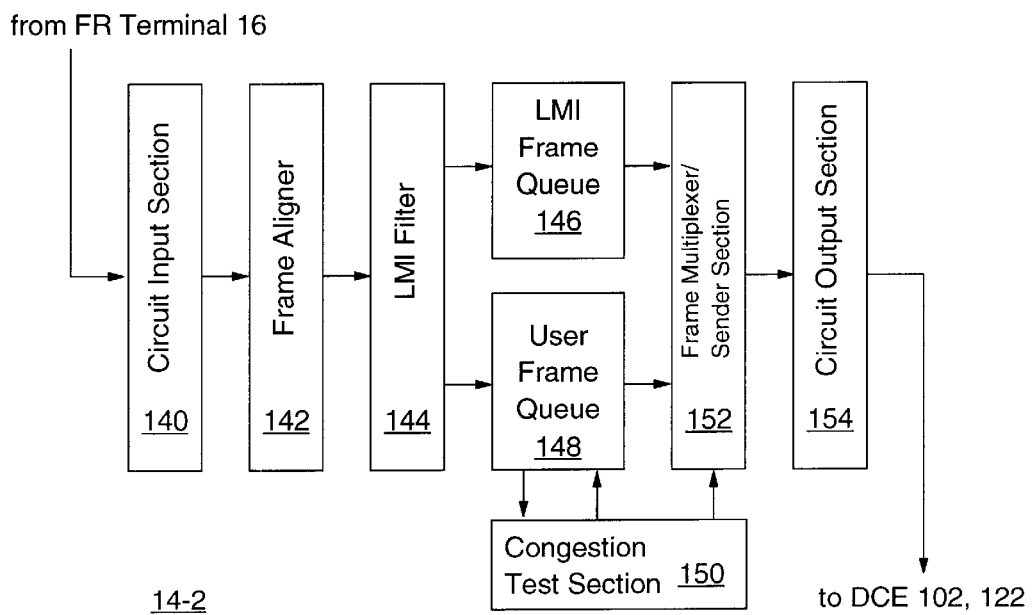
FIG. 3 is a diagram illustrating a configuration of a multiplexer shown in FIG. 1.

FIG. 3 illustrates a configuration of the multiplexer 14-2 shown in FIG. 1. As shown in FIG. 3, the multiplexer 14-2 comprises a circuit input section 140, a frame aligner section 142, an LMI filter section 144, an LMI frame queue 146, a user frame queue 148, a congestion test section 150, a frame multiplexer/sender section 152, and a circuit output section 154.

With these constituents, the multiplexer 14-2 performs a certain operation on an FR frame from the FR terminal 16 for transmitting this FR frame toward the communication network 10, whereas it transmits an FR frame in an opposite direction toward the FR terminal 16 in a transparent manner. The multiplexer 14-1, having the same configuration as the multiplexer 14-2, performs a certain operation on an FR frame from the communication network 10 for transmitting this FR frame toward the FR terminal 16, whereas it transmits an FR frame in an opposite direction toward the communication network 10 in a transparent manner. Hereinafter, transmission processing by the multiplexer 14-2 will be described. It should be understood here that this is the same as transmission processing by the multiplexer 14-1.

Circuit Input Section 140

The circuit input section 140 receives data, inputted from the FR terminal 16 via the data transmission path 18, and outputs this data to the frame aligner section 142.

The frame aligner section 142 detects the FLG fields of FR frames inputted from the circuit input section 140, segments them on an FR frame basis, and outputs the segmented FR frames to the LMI filter section 144.

The LMI filter section 144 checks an address value in the DLCI (FIG. 2(B)) of an FR frame inputted from the frame aligner section 142, and if this address value is equal to "0" (for the ANSI standard; "1023" for another standard), determines that this FR frame is an LMI frame stored with LMI data in the user information field (FIG. 2(B)), thereby to output this FR frame to the LMI frame queue 146. Otherwise, i.e., if the address value is not equal to "0", it determines that this FR frame is a user frame stored with data other than LMI data in the user information field, thereby to output this FR frame to the user frame queue 148.

LMI Frame Queue 146

The LMI frame queue 146, comprising a readable/writable memory circuit such as a RAM or the like, queues one or more LMI frames inputted from the LMI filter section 144 and provides them to the frame multiplexer/sender section 152. Also, the LMI frame queue 146 provides data, indicating locations of these frames in this queue, existence of this queue and the like, to the congestion test section 150.

The user frame queue 148, comprising a RAM or the like as in the LMI frame queue 146, queues one or more user frames inputted from the LMI filter section 144 and provides them to the frame multiplexer/sender section 152. Also, the user frame queue 148 provides data, indicating the number or a data amount of queued user frames (they are collectively called "data amount"), locations of these frames in this queue and the existence of this queue, to the congestion test section 150.

The congestion test section 150 determines an occurrence of congestion if a data amount of user frames inputted from the user frame queue 148 exceeds a threshold value "th", which was previously calculated based on a transmission capacity "x" of the data transmission path 18 (committed transmission capacity of a virtual circuit) and the like. Congestion test section 150 notifies the frame multiplexer/sender section 152 of such an occurrence of congestion for causing this section 152 to read out all of LMI data queued in the LMI frame queue 146, together with all of transmissible ones of user frames queued in the user frame queue 148 for sending to the circuit output section 154. Note in this respect that said transmissible user frames are transmissible in a remaining portion "z" of the transmission capacity "x" (z=x−y; where y is a complementary portion of the transmission capacity required for transmitting all of LMI frames queued in the LMI frame queue 146) of the data transmission path 18 except the complementary portion that has been applied to sending all of the LMI frames.

Also, the congestion test section 150 determines non-occurrence of congestion on the data transmission path 18 if a data amount of user frames inputted from the user frame queue 148 does not exceed the threshold value "th", controls the frame multiplexer/sender section 152 and the user frame queue 148 to cause LMI frames and user frames to be provided to the circuit output section 154. In other words, the congestion test section 150 controls the frame multiplexer/sender section 152 to cause it to provide all LMI frames in the LMI frame queue 146 and all of user frames in the user frame queue 148 to the output circuit section 154.

In the multiplexer 14-2, during a period in which its congestion test section 150 determines an occurrence of congestion, its frame multiplexer/sender section 152 sets a value of the forward explicit congestion (FECN) bits of an FR frame, which is transmitted from the FR terminal 16 toward the communication network 10, to "1" for indicating the occurrence of congestion. In the multiplexer 14-1, during a period in which its congestion test section 150 determines an occurrence of congestion, its frame multiplexer/sender section 152 sets a value of the backward explicit congestion (BECN) bits of an FR frame, which is transmitted in an opposite direction, i.e., from the communication network 10 toward the FR terminal 16, to "1" for indicating the occurrence of congestion. Incidentally, except for a period in which the congestion test section 150 determines an occurrence of congestion, the frame multiplexer/sender section 152 of either of the multiplexers 14-1, 14-2 does not operate on the CN bits. Rather, this section 152 reads FR frames from the LMI frame queue 146 and the user frame queue 148 for multiplexing them on an FR frame basis, and sends the same to the circuit output section 154. Also, under the control of the congestion test section 150, the frame multiplexer/sender section 152 discards those user frames read out of the user frame queue 148 that are not to be outputted to the circuit output section 154.

The circuit output section 154 transmits data, including FR frames inputted from the frame multiplexer/sender section 152, to the data transmission path 18.

The FR terminal 16, which may comprise a computer having communication functions, transmits data pursuant to the frame relay architecture in accordance with FR UNI.

The data transmission path 18 is a transmission network such as an N-ISDN communication network or a low-speed data transmission network, which has a smaller transmission capacity than the data transmission paths 110, 130. Between the multiplexers 14-1, 14-2, this data transmission path 18 is adapted for transmitting data pursuant to the frame relay architecture or another architecture, which occurs between the FR terminal 16-1 and the communication network 10 as well as the FR terminal 16-2 and the communication network 12, in a multiplexing manner.

Figure 4:
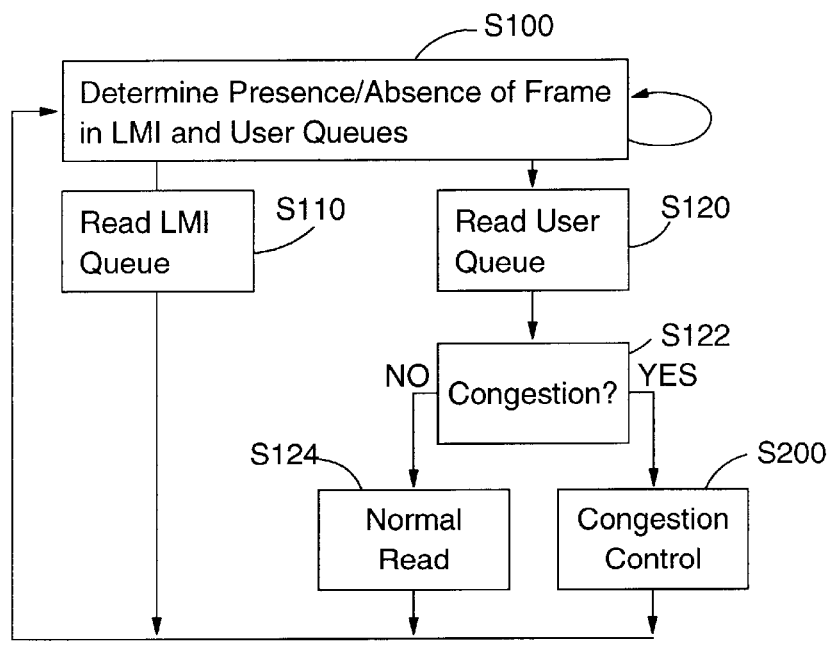
FIG. 4 is a flow chart illustrating a queue reading process in the multiplexer 14 shown in FIGS. 1 and 3.
Figure 5:
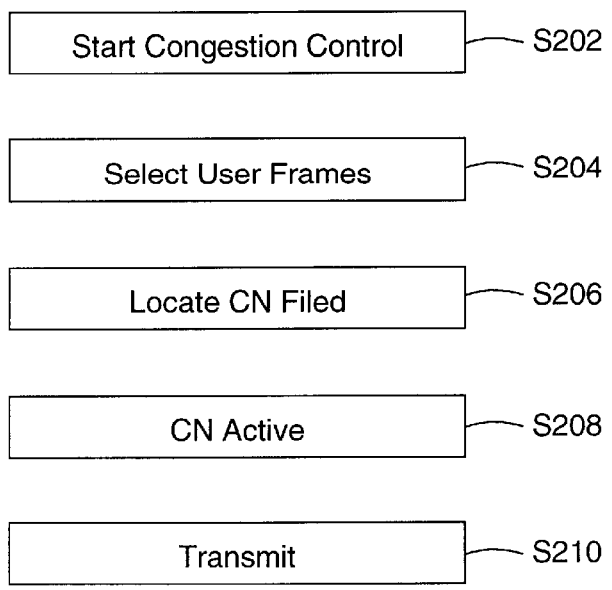
FIG. 5 is a flow chart illustrating a congestion control process (S200) shown in FIG. 4.

Hereinafter, with reference to FIGS. 4 and 5, operations of the data transmission system 1 will be described in detail. Note that for brevity and clarity of description, only those operations for transmitting data from the FR terminal 16 (FIG. 1) to the communication network 10 will be exemplified below. It should be understood that similar operations for transmitting data in an opposite direction from the communication networks 10, 12 to the FR terminal 16 may be carried out in substantially the same manner. FIG. 4 is a flow chart illustrating a queue reading process in the multiplexer 14 shown in FIGS. 1 and 3. FIG. 5 is a flow chart illustrating a congestion control process (S200) shown in FIG. 4.

The FR terminal 16 transmits LMI frames and user frames (FR frames) via a PVC established between the FR terminal 16 and the communication network 10.

In the multiplexer 14-2 (FIGS. 1 and 3), the circuit input section 140 receives data from the FR terminal 16 and outputs the same to the frame aligner section 142 The frame aligner section 142 segments the received frames from each other and outputs the segmented frames to the LMI filter section 144. The LMI filter section 144 checks the address fields (FIG. 2) of the inputted FR frames, outputs LMI frames of the inputted FR frames to the LMI frame queue 146, and outputs user frames to the user frame queue 148 for queuing therein.

As shown in FIG. 4, at step 100 (S100), the frame multiplexer/sender section 152 determines if any FR data is queued in either the LMI frame queue 146 or the user frame queue 148. If LMI data is queued in the LMI frame queue 146, the process proceeds to S110. Otherwise, i.e., if user data is queued in the user frame queue 148, the process proceeds to S120.

At step 110 (S110), the frame multiplexer/sender section 152 reads LMI data from the LMI frame queue 146 and provides it to the circuit output section 154, which in turn outputs the inputted LMI data to the data transmission path 18.

The congestion test section 150 always determines whether or not there occurs congestion on the data transmission path 18 based on a data amount within the user frame queue 148 and, if so, notifies the frame multiplexer/sender section 152 of the congestion status. At step 120 (S120), the frame multiplexer/sender section 152 starts reading of user data queued in the user frame queue 148.

At step 122 (S122), the frame multiplexer/sender section 152 determines the congestion status notified by the congestion test section 150 and, if there is no occurrence of congestion, reads user frames from the user frame queue 148, and causes them to be sent to the data transmission path 18 via the circuit output section 154 (S124).

At step 200 (S200), the frame multiplexer/sender section 152 performs a congestion control process. As shown in FIG. 5, at step 202 (S202), the frame multiplexer/sender section 152 starts the congestion control process.

At step 204 (S204), the frame multiplexer/sender section 152 preferentially treats those frames stored with the discard eligible bits (FIG. 2, DE bits) indicating discard ineligibility, such that a portion of user frames queued in the user frame queue 148 (which is transmissible by making full use of a remaining portion of the transmission capacity "x" after having transmitted LMI frames) is selected for reading therefrom, whereas it discards other user frames. Incidentally, such selection of user frames may be made by the frame multiplexer/sender section 152 in the order of queuing or another rule other than the order of queuing.

At step 206 (S206), the frame multiplexer/sender section 152 operates on the CN bits, and detects a storage location (CN field) of the CN bits in each user frame selected at step 204 (S204).

At step 208 (S208), the frame multiplexer/sender section 152 sets the CN bits to a value indicating an occurrence of congestion (CN Active).

At step 210 (S210), the frame multiplexer/sender section 152 of the multiplexer 14-2 operates on the forward explicit congestion (FECN) bits, whereas the frame multiplexer/sender section 152 of the multiplexer 14-1 operates on the backward explicit congestion (BECN) bits. In accordance with a notification from the congestion test section 150, the frame multiplexer/sender section 152 sets the CN bits of user frames to certain values and transmits the same toward the data transmission path 18.

The multiplexer 14-1 receives an FR frame via the data transmission path 18, and outputs the received frame toward the communication network 10 in a transparent manner. In the communication network 10, the data transmission path 110 transmits an FR frame inputted from the frame relay switching equipment 102 toward a communication node designated by a destination address. Each communication node in the communication network 10, which communicates with the FR terminal 16, performs in accordance with a value of the CN bits contained in an FR frame received from the FR terminal 16.

As described above, in accordance with the data transmission method in the data transmission system 1, it is possible to assure a transparent transmission of LMI frames. Accordingly, in the data transmission system 1, there will be no occurrence of any disorganized communication control which may accrue from discard of an LMI frame, thereby to improve reliability of a data transmission. Also, in accordance with the data transmission method in the data transmission system 1, congestion control is performed in accordance with the standard of the frame relay architecture and, hence, it may be easily applied to an existing data transmission system pursuant to the frame relay architecture.

Also, since a transmission amount of LMI frames is not, in general, increased in a burst fashion unlike a transmission amount of user frames, there will be no chance that a preferential transmission of LMI frames results in an undesirable situation where user frames are excessively discarded to provide a detrimental effect to a normal data transmission. Accordingly, in accordance with the data transmission method in the data transmission system 1, it is possible by means of the aforesaid simple control to consistently implement a transparent transmission of LMI frames and suppression of a discarded amount of user frames to a minimum.

It should be noted here that the configuration of the data transmission system 1 shown in FIG. 1 is exemplary and number/type of each constituent (including communication networks, frame relay switching equipment, communication nodes, and FR terminals) may be arbitrary. Also, while the multiplexer 14 is configured to operate on either one of the forward explicit congestion (FECN) bit and the backward explicit congestion (BECN) bit, the multiplexer 14 may be configured to operate on both of them.

Advantages of the Invention

As described above, in accordance with the data transmission apparatus and method of this invention, it is possible to transparently transmit data required for communication control between communication nodes even if there occurs a band shortage/congestion. Also, in accordance with the data transmission apparatus and method of this invention, it is possible to transmit all of the LMI data required for supporting an LMI necessarily used for communication control between communication nodes even if there occurs a band shortage/congestion in a communication system configured to perform a data transmission pursuant to the frame relay architecture, thereby solving the problem that any further data transmission becomes impossible due to discard of LMI data.

Further, in accordance with the data transmission apparatus and method of this invention, it is possible to effectively perform congestion control between data terminals with a simple process by noting a result of operation made by an apparatus configured to perform a data transmission pursuant to the frame relay architecture with respect to congestion controlling data (CN bits) within a data transmitting frame (FR frame).

What is claimed:

1. A data transmission apparatus for connecting a plurality of communication nodes to transmit data via circuits established between said communication nodes, said plurality of communication nodes transmitting control data for use in controlling the data transmission and communication data other than said control data to each other, comprising:
   control data queuing means for queuing said control data from a first communication node transmitting data to a second communication node;
   control data queuing means for queuing said control data from a first communication node;
   communication data queuing means for queuing said communication data from the first communication node; and
   data transmission means responsive to a state of congestion on a data circuit between the first and second communication nodes for transmitting all of said queued control data and at least a portion of said communication data in the data queuing means from said first communication node to said second communication node in accordance with a transmission capacity between the first and second communication nodes.

2. A data transmission apparatus for connecting a plurality of communication nodes to transmit data via circuits established between said communication nodes, said plurality of communication nodes transmitting control data for use in controlling the data transmission and communication data other than said control data to each other, comprising:
   control data queuing means for queuing said control data from a first communication node transmitting data to a second communication node; and
   data transmission means responsive to a state of congestion on a data circuit between the first and second communication nodes for transmitting all of said queued control data and at least a portion of said queued communication data from said first communication node to said second communication node in accordance with a transmission capacity between said communication nodes, wherein said communication nodes store said control data or said communication data into certain frames and transmit the said frames to each other;
   said certain frames contain identification data for indicating whether or not at least said control data is stored therein;
   said control data queuing means comprises:
      separation means, responsive to said identification data contained in said frames received from said first communication node, for separating said frames stored with said control data from said frames stored with said communication data;
      a control data queue for queuing said separated frames stored with said control data; and
      a communication data queue for queuing said separated frames stored with said communication data; and
      said data transmission means transmits all of said queued frames stored with said control data and at least a portion of said queued frames stored with said communication data to said second communication node in accordance with a transmission capacity between said communication nodes transmitting data to each other.

3. The data transmission apparatus of claim 2, wherein said data transmission means comprises:
   congestion detection means for detecting an occurrence of congestion between said first communication node and said second communication node when a data amount of said queued frames stored with said control data and/or said queued frames stored with said communication data exceeds a certain threshold value; and sending means, responsive to detection of the congestion between said first communication node and said second communication node, for sending all of said queued frames stored with said control data and at least a portion of said queued frames stored with said communication data, which is within the rest of the transmission capacity between said first communication node and said second communication node, to said second communication node.

4. The data transmission apparatus of claim 3, wherein said plurality of communication nodes store said control data and said communication data into said frames and transmit the frames to each other in such a manner that in case of storing said control data into the frames, addresses therein used as said identification data are set to have certain values, whereas in case of storing said communication data into the frames, said addresses are set to have values other than said certain values; and said separation means separates said frames stored with said control data and said addresses having said certain values from said frames stored with said communication data and said addresses having values other than said certain values.

5. The data transmission apparatus of claim 4, wherein said sending means sets congestion controlling data of said frames to values indicating an occurrence of congestion while there is occurring congestion between said first communication node and said second communication node and sends the frames to said second communication node; and each of said plurality of communication nodes is responsive to said congestion controlling data of received frames indicating the occurrence of congestion for performing congestion control.

6. A data transmission method for transmitting data via circuits established between a plurality of communication nodes, comprising the steps of:

at said plurality of communication nodes, storing control data for use in controlling a data transmission or communication data other than said control data into frames, setting addresses therein to have values for indicating whether or not the frames are stored with said control data, and transmitting the frames to each other;

if the values of said addresses contained in said frames received at a second communication node from a first communication node indicate that the received frames are stored with said control data, separating the received frames as frames that are stored with said control data;

if the values of said addresses contained in frames received from said first communication node indicate that the received frames are not stored with said control data, separating the said received frames as frames stored with said communication data;

queuing said separated frames stored with said control data;

queuing said separated frames stored with said communication data;

if a data amount of said queued frames stored with said control data and/or said queued frames stored with said communication data exceeds a certain threshold value, detecting an occurrence of congestion between said first communication node and the second communication node;

and responding to detection of the congestion between said first communication node and said second communication node for transmitting all of said queued frames stored with said control data and at least a portion of said queued frames stored with said communication data, which is within the rest of the transmission capacity between said first communication node and said second communication node, to said second communication node.

7. The data transmission method of claim 6, comprising the steps of:

setting congestion controlling data of said frames to values indicating an occurrence of congestion while there is occurring congestion between said first communication node and said second communication node and sending the frames to said second communication node; and at each of said plurality of communication nodes, responding to said congestion controlling data of received frames indicating the occurrence of congestion for performing congestion control.

8. A computer readable storage medium for storing a program adapted for use in a data transmission system for transmitting data via circuits established between a plurality of communication nodes, said program being executable by a computer to carry out method steps of:

at said plurality of communication nodes, storing control data for use in controlling a data transmission or communication data other than said control data into frames, setting addresses therein to have values for indicating whether or not the frames are stored with said control data, and transmitting the frames to each other;

if the values of said addresses contained in said frames received at a second communication node from a first communication node indicate that the received frames are stored with said control data, separating the said received frames as frames stored with said control data;

if the values of said addresses contained in said frames received from said first communication node indicate that the received frames are not stored with said control data, separating the said received frames as frames stored with said communication data;

queuing said separated frames stored with said control data;

queuing said separated frames stored with said communication data;

if a data amount of said queued frames stored with said control data and/or said queued frames stored with said communication data exceeds a certain threshold value, detecting an occurrence of congestion between said first communication node and the second communication node; and responding to detection of the congestion between said first communication node and said second communication node for transmitting all of said queued frames stored with said control data and at least a portion of said queued frames stored with said communication data, which is within the rest of the transmission capacity between said first communication node and said second communication node, to said second communication node.

* * * * *